United States Patent
Hiramoto (10) Patent No.: US 9,058,069 B2
(45) Date of Patent: Jun. 16, 2015

(54) WRITING INSTRUMENT FOR ELECTROSTATIC CAPACITANCE TYPE TOUCH PANEL

(71) Applicant: NIHON SANMO DYEING CO., LTD., Kyoto-shi, Kyoto (JP)

(72) Inventor: Takeshi Hiramoto, Kyoto (JP)

(73) Assignee: NIHON SANMO DYEING CO., LTD., Kyoto (JP)

( * ) Notice: Subject to any disclaimer, the term of this patent is extended or adjusted under 35 U.S.C. 154(b) by 30 days.

(21) Appl. No.: 14/072,467

(22) Filed: Nov. 5, 2013

(65) Prior Publication Data
US 2014/0125627 A1 May 8, 2014

(30) Foreign Application Priority Data
Nov. 8, 2012 (JP) .................. 2012-246126

(51) Int. Cl.
*G06F 3/0354* (2013.01)
*G06F 3/044* (2006.01)
*G06F 3/041* (2006.01)

(52) U.S. Cl.
CPC ............ *G06F 3/03545* (2013.01); *G06F 3/044* (2013.01); *G06F 3/041* (2013.01)

(58) Field of Classification Search
CPC ....... G06F 3/044; G06F 3/041; G06F 3/0412; G06F 3/0416; G06F 3/033
See application file for complete search history.

(56) References Cited

U.S. PATENT DOCUMENTS

| | | | |
|---|---|---|---|
| 8,199,132 B1 * | 6/2012 | Oda et al. | ........................ 345/179 |
| 2012/0026127 A1 * | 2/2012 | Kim | ............................. 345/174 |
| 2012/0327045 A1 | 12/2012 | Skinner | |
| 2013/0240241 A1 | 9/2013 | Dubrow et al. | |

FOREIGN PATENT DOCUMENTS

| | | |
|---|---|---|
| JP | 10-171580 A | 6/1998 |
| JP | 3176454 U | 6/2012 |
| JP | 2012-168933 A | 9/2012 |
| JP | 3179221 U | 10/2012 |
| TW | M415358 U | 11/2011 |

(Continued)

OTHER PUBLICATIONS

Office Action received in Japanese Application No. 2012-246126 dated Jan. 22, 2013.

(Continued)

*Primary Examiner* — Michael Faragalla
(74) *Attorney, Agent, or Firm* — Foley & Lardner LLP (57) ABSTRACT

A writing instrument for an electrostatic capacitance type touch panel is provided which includes a main body shaft having a hollow portion and made of non-conductive material, a core portion composed of a member having base material made of non-conductive material and modified with conductive material, and a brush tip including conductive material. The core portion is provided in the hollow portion, and the brush tip and the core portion are in contact with each other. The member is a conductive fiber having base material made of polyester-based synthetic fiber, acrylic synthetic fiber, or polyamide-based synthetic fiber and covered with conductive material. Further, the core portion is formed by filling a cylindrical body with the conductive fiber. This writing instrument can employ non-conductive material for the main body shaft, and capable of performing touch-panel operation stably.

6 Claims, 3 Drawing Sheets

(56) References Cited

FOREIGN PATENT DOCUMENTS

| TW | 201227434 A | 7/2012 |
| WO | WO-2012/124280 A1 | 9/2012 |

OTHER PUBLICATIONS

Office Action issued in Taiwan Patent Application No. 102140118 dated Mar. 11, 2015.

* cited by examiner

WRITING INSTRUMENT FOR ELECTROSTATIC CAPACITANCE TYPE TOUCH PANEL

BACKGROUND OF THE INVENTION

1. Field of the Invention

The present invention relates to a writing instrument for operating an electrostatic capacitance type touch panel, in other words, a writing instrument for an electrostatic capacitance type touch panel.

2. Description of the Background Art

In recent years, as typified by a smart phone, a tablet computer, a mobile game machine, and the like, electronic equipment provided with a touch panel is commercialized in succession and widely used. A touch panel is an electronic part with a combination of a display device and a position input device, and there are various types such as a resistive film type, an infrared ray type, an electrostatic capacitance type, and the like according to operating principles. Among those, the resistive film type touch panel is currently on the main stream. However, because a smart phone employing an electrostatic capacitance type touch panel enabling multipoint detection (multi-touch) has appeared, the electrostatic capacitance type touch panel attracts attention.

SUMMARY OF THE INVENTION

An electrostatic capacitance type touch panel is a touch panel of a type performing position detection by detecting a change in an electrostatic capacitance occurred between a finger tip and a conductive film provided in a panel when the panel is touched with a finger or the like. Among electrostatic capacitance type touch panels, a panel enabling multi-touch operation is referred to as a projection type and is composed of an insulating film, an electrode pattern including two layers of transparent electrodes arranged under the insulating film, an integrated circuit performing arithmetic processing, and the like.

Operation of an electrostatic capacitance type touch panel is basically performed with a finger tip. However, there is a known disadvantage that operation with a finger tip may contaminate a panel surface with sebum and fingerprints to thereby impair the appearance, and may lower operation accuracy due to contamination. Therefore, for example, use of a touch pen as disclosed in Japanese Patent Laying-Open No. 10-171580 (PTD 1) or the like is beginning.

CITATION LIST

Patent Document

PTD 1: Japanese Patent Laying-Open No. 10-171580

A human body can be regarded as a capacitor of a kind having an electrostatic capacity of about 10 pF. A conventional touch pen has a conductive pen tip and a conductive pen main body shaft. The touch panel operation is performed by rendering the pen tip and a human body to have a conductive state and using the human body as a capacitor. In other words, there is a limitation that conductive material must be used for the pen main body shaft. The conductive material used here is typically metal material, or for instance resin material to which conductive material as disclosed in PTD 1 is kneaded.

However, there has been a disadvantage that these materials are poor in views of a degree of freedom in designing and manufacturing costs as compared to typical resin material such as polypropylene used for a main body shaft of a general marker pen and the like. A writing instrument enabling stable touch-panel operation while using non-conductive material for a main body shaft and electrically insulating a pen tip from a human body has never been developed.

The present invention was achieved in view of the current situation as described above, and its object is to provide a writing instrument for an electrostatic capacitance type touch panel capable of employing non-conductive material for a main body shaft and enabling stable touch-panel operation.

After conducting diligent study to solve the problem described above, the inventor obtained knowledge that providing a core portion composed of a member having base material made of non-conductive material and modified with conductive material, such as a stick-like structure obtained by shaping an aggregate of conductive fibers with resin, in a hollow main body shaft of a writing instrument enables operation of an electrostatic capacitance type touch panel even in the state where a tip of the writing instrument (hereinafter, also referred to as a brush tip) in contact with the touch panel is electrically insulated from a human body. Then, the inventor conducted further study based on this knowledge to complete the present invention.

In other words, a writing instrument for an electrostatic capacitance type touch panel according to the present invention includes a main body shaft having a hollow portion and made of non-conductive material, a core portion composed of a member having base material made of non-conductive material and modified with conductive material, and a brush tip including conductive material. The core portion is provided in the hollow portion, and the brush tip and the core portion are in contact with each other. The member is a conductive fiber having base material made of a polyester-based synthetic fiber, an acrylic synthetic fiber, or a polyamide-based synthetic fiber and covered with conductive material, and the core portion is formed by filling a cylindrical body with the conductive fiber.

Here, preferably, the core portion is a porous body. Further, preferably, the core portion and the brush tip constitute an integrated object.

Further, preferably, the base material made of the synthetic fiber has a fiber diameter of greater than or equal to 5 μm and less than or equal to 200 μm, and the conductive fiber has a surface electric resistance value of greater than or equal to $10^{-1}$ Ωcm and less than or equal to $10^{9}$ Ωcm. Further, preferably, a porosity of the core portion is greater than or equal to 10% and less than or equal to 95%.

Further, the member may be a conductive member having base material, which is a porous body made of polyester-based synthetic resin, acrylic synthetic resin, polyamide-based synthetic resin, or polyurethane-based synthetic resin, modified with conductive material. More preferably, the member may be a conductive member having a porous resin compact made of polyurethane-based synthetic resin and modified with conductive material. Further, the porous resin compact made of polyurethane-based synthetic resin is preferably a urethane foamed compact.

Further, the conductive material is sulfide made of at least one kind of metal selected from a group consisting of copper (Cu), silver (Ag), palladium (Pd), and cobalt (Co), or plated metal made of at least one kind of metal selected from a group consisting of copper (Cu), silver (Ag), and nickel (Ni).

A writing instrument for an electrostatic capacitance type touch panel according to the present invention can employ non-conductive material for a main body shaft and enables stable touch-panel operation.

The foregoing and other objects, features, aspects and advantages of the present invention will become more appar-

DESCRIPTION OF THE PREFERRED EMBODIMENTS

Hereinafter, configurations of writing instruments for an electrostatic capacitance type touch panel according to embodiments of the present invention will be described more in detail with reference to the drawings. However, the present invention is not limited to these configurations. In the following drawings, the parts having the same reference numerals are considered as having the same function, and description thereof will not be repeated.

First Embodiment

Writing Instrument

Figure 1:
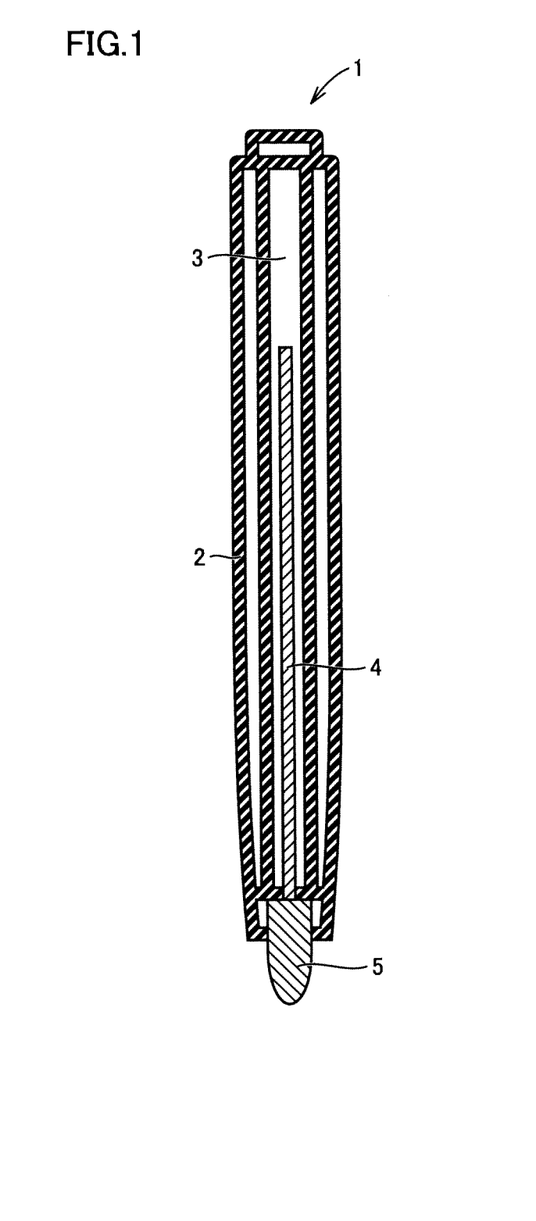
FIG. 1 is a cross-sectional view schematically representing an example of a writing instrument for an electrostatic capacitance type touch panel according to an embodiment of the present embodiment.

FIG. 1 is a cross-sectional view schematically representing a writing instrument for an electrostatic capacitance type touch panel as an example of the embodiment of the present invention. A writing instrument 1 illustrated in FIG. 1 is composed of a main body shaft 2 having a hollow portion 3 at its inside and made of non-conductive material, a core portion 4 composed of a member having base material made of non-conductive material and modified with conductive material, and a brush tip 5 including conductive material. As shown in FIG. 1, core portion 4 is provided in hollow portion 3, and brush tip 5 and core portion 4 are in contact with each other.

Here, a way of bringing brush tip 5 and core portion 4 in contact with each other is not particularly limited. For example, both of these may be fitted to each other in a fitting structure or may be bonded by means of glue. Further, when both of these are made of a synthetic fiber or synthetic resin, they may be heated for welding. As will be described later, brush tip 5 and core portion 4 may constitute an integrated object.

Writing instrument 1 having the configuration described above exhibits a superior effect that operation of the electrostatic capacitance touch panel is enabled by gripping non-conductive main body shaft 2 and touching a panel surface with brush tip 5.

Details of a mechanism for expressing the effect of the present invention are unknown for now. However, the inventor surmised that an electrostatic capacity of the touch panel can be changed in a manner similar to the operation with a finger tip because the core portion composed of a member having base material made of non-conductive material and modified with conductive material has a function as a capacitor of a kind and can remove electrical charge from a surface of a touch panel through the brush tip including the conductive material and store electric charge to maintain a constant voltage.

Hereinafter, each of the parts constituting the writing instrument according to the present invention will be described.

<<Main Body Shaft>>

Main body shaft 2 is composed of non-conductive material and has hollow portion 3 at its inside. Typically, the shape and size of main body shaft 2 can be configured similar to a conventionally known marker, marker pen, or the like. The shape and size of main body shaft 2 are not particularly limited, and may have desirable shape and size taking in consideration the easiness in gripping and appearance.

(Non-Conductive Material)

Main body shaft 2 needs to be composed of non-conductive material. Here, the non-conductive material is material having a resistivity roughly exceeding $10^9$ Ωcm. Such non-conductive material includes general synthetic resin. For example, polypropylene, polyethylene, polyvinyl chloride, polystyrene, polyvinyl acetate, Teflon (registered trademark), acrylonitrile butadiene styrene resin, acrylic resin, and the like can be used. Further, for example, this non-conductive material also includes wood, bamboo, and the like. The writing instrument according to one embodiment of the present invention can employ non-conductive material for the main body shaft, so that high designability and reduction in manufacturing cost can be achieved.

(Hollow Portion)

Typically, hollow portion 3 is a cylindrical hollow. The structure, material, shape, and size of hollow portion 3 are not particularly limited, and any alternatives may be employed as long as core portion 4 can be provided and held. Hollow portion 3 may be for instance a hollow formed in main body shaft 2 (in other words, main body shaft 2 and hollow portion 3 may be integrated). Alternatively, for example, an additional tube or the like made of synthetic resin may be inserted into a hollow formed in main body shaft 2 to have hollow portion 3.

<<Core Portion>>

Core portion 4 is composed of a member having base material made of non-conductive material and modified with conductive material, and is provided in hollow portion 3. It is considered that the writing instrument according to one embodiment of the present invention can operate an electrostatic capacitance type touch panel even when main body shaft 2 is made of non-conductive material because core portion 4 has a function as a capacitor of a kind. Although the shape of core portion 4 is not particularly limited, it is preferable to have a columnar shape, a rectangular columnar shape, and a stick-like shape in conformity with the shape and size of main body shaft 2 and hollow portion 3 in view of easiness in production.

Core portion 4 is composed of a member having base material made of non-conductive material and modified with conductive material. Such a core portion preferably includes at least one of the following configurations (A) and (B).

[Configuration (A): Member Having Base Material Made of a Synthetic Fiber and Covered with Conductive Material]

In the configuration (A), the core portion is composed of a member having base material made of a synthetic fiber and covered with conductive material. In this case, the member is a conductive fiber having base material made of synthetic fiber and covered with conductive material. The core portion is an aggregate of fibers including the conductive fiber. Here, preferably, all of the fibers included in the core portion are conductive fibers. However, conductive fibers and non-conductive fibers may be mixed.

The inventor assumed that the core portion having the configuration (A) has at its inside a structure similar to a capacitor partially made of two conductive fibers and air as an insulating body sandwiched between the conductive fibers, and forming a plurality of such structures allows a whole core portion to exhibit a function similar to a capacitor.

(Member)

As described above, in the configuration (A), the member is a conductive fiber having base material made of a synthetic fiber and covered with conductive material.

(Base Material)

Here, the base material in the configuration (A) includes not only a single fiber but also an aggregate of a plurality of fibers.

(Aggregate of Fibers)

The aggregate of fibers is an aggregate of a plurality of fibers having a certain two-dimensional shape, three-dimensional shape, or the like. Such an aggregate of fibers may be, for example, a fiber structure such as fabric, web, non-woven fabric, felt, and the like, a fiber bundle formed by orienting a plurality of fibers in one direction and bundling the same, other than an aggregate formed by simply aggregating a plurality of fibers. Here, the one formed by simply aggregating a plurality of fibers is inserted and filled into the hollow portion to have a certain shape corresponding to an inner shape of the hollow portion.

Further, for example, a porous fiber structure formed by impregnating resin into a bundle of synthetic fibers and pultruding the same, and a porous fiber structure formed by impregnating resin into the aggregate of fibers and applying compression molding to the same are also included. In other words, the base material may be of a porous body, so that the core portion can be a porous body. In view of easiness in exhibiting a function similar to the capacitor as described above, and in view of easiness in conductive processing described later, such a porous body preferably includes many open pores. Thus, a porosity is preferably greater than or equal to 10% and less than or equal to 95%, and more preferably greater than or equal to 10% and less than or equal to 90%.

(Conductive Fiber)

A conductive fiber is preferably a conductive fiber having base material made of synthetic fiber and covered with conductive material. The inventor knows that the effect described above can be readily expressed with such a configuration that the fiber is not simply a conductor but has a core member being a dielectric, and a conductive layer is formed on a surface of the core member. Here, a part of the base material made of a synthetic fiber may have a portion not covered with conductive material. However, covering a whole surface of the base material is preferable in view of easiness in obtaining the effect described above.

Further, such a conductive fiber, when it forms an aggregate of fibers, can have a function similar to that of a capacitor and be superior in self-discharging characteristics, so that excessive electrical charge can be naturally discharged. Consequently, the writing instrument according to one embodiment of the present invention is considered to enable stable touch-panel operation repeatedly.

Here, in view of the self-charging characteristics described above, the surface electric resistance value of the conductive fiber is preferably greater than or equal to $10^{-1}$ $\Omega$cm and less than or equal to $10^9$ $\Omega$cm, and more preferably greater than or equal to $10^1$ $\Omega$cm and less than or equal to $10^8$ $\Omega$cm, yet more preferably greater than or equal to $10^2$ $\Omega$cm and less than or equal to $10^6$ $\Omega$cm.

(Synthetic Fiber)

As a synthetic fiber to be base material of a conductive fiber, it is preferable to employ a polyester-based synthetic fiber, an acrylic synthetic fiber, or a polyamide-based synthetic fiber. More specifically, as a polyester-based synthetic fiber, it is preferable to employ polybutylene terephthalate and polyethylene terephthalate. As an acrylic synthetic fiber, it is preferable to employ acrylonitrile and Modacryl manufactured by Kaneka Corporation. Further, as a polyamide-based synthetic fiber, it is preferable to employ nylon 6, nylon 66, and nylon 612.

Here, the fiber diameter of the base material made of synthetic fiber is preferably less than or equal to 200 µm, and more preferably less than or equal to 100 µm. Further, in view of easiness in handling, greater than or equal to 5 µm is preferable. When the fiber diameter exceeds 200 µm, there is a tendency that the effect described above becomes difficult to obtain, thus it is not preferable.

The base material made of such synthetic fiber can be manufactured for instance by melt-spinning, or can also be manufactured for instance by producing a film made of synthetic fiber and finely cutting the same.

(Conductive Material)

As conductive material covering the base material made of synthetic fiber, it is preferable to employ sulfide of at least one kind of metal selected from a group consisting of copper (Cu), silver (Ag), palladium (Pd), and cobalt (Co), or plated metal of at least one kind of metal selected from a group consisting of copper (Cu), silver (Ag), and nickel (Ni). Among those, in view of difficulty in separation and low reactivity with oxygen after formation, it is preferable to employ copper sulfide which is sulfide of Cu, and $Cu_9S_5$ is particularly preferable as the copper sulfide.

A covering amount of conductive material is preferably greater than or equal to 1 mass % and less than or equal to 30 mass % with respect to the mass of base material made of synthetic fiber. When the covering amount falls within the range described above, the core portion tends to be readily exhibiting the function described above. More preferable range of the covering amount is greater than or equal to 1 mass % and less than or equal to 15 mass %, and a particularly preferable range is greater than or equal to 2 mass % and less than or equal to 7 mass %.

As a method of covering the base material made of synthetic fiber with conductive material, when the conductive material is copper sulfide, a method of dipping the aggregate of the synthetic fiber in an aqueous solution (hereinafter, referred to as "process liquid") containing, for instance, copper salt and thiosulfate can be used. In the following description, "dipping in process liquid" in such a manner will be referred to as "applying a conductive process."

(Others)

Further, the conductive fiber may have a binder such as silane coupling agent. For example, providing the silane coupling agent between the base material made of synthetic fiber and the conductive material causes strong bonding between the base material and the silane coupling agent and strong bonding between the conductive material and the silane coupling agent. Therefore, separation of the conductive material can be suppressed efficiently, so that durability of the conductive fiber can be improved.

[Configuration (B): Member Having Base Material Made of Porous Resin Compact Modified with Conductive Material]

In the configuration (B), the core portion is composed of a member having base material made of a porous resin compact and modified with conductive material. In this case, the core portion may be composed of a plurality of members or a single member. The base material made of a porous resin compact needs to have a surface modified with the conductive material and is preferably modified with conductive material to inside of fine pores.

The inventor assumed that the core portion having the configuration (B) also has at its inside a structure similar to a capacitor partially composed of two conducive portions made of conductive material and air as an insulating body or resin as a dielectric sandwiched between the conductive portions partially, and forming a plurality of such structures allows a whole core portion to exhibit a function similar to a capacitor.

(Member)

In the configuration (B), the member is a member having base material made of a porous resin compact modified with conductive material.

(Base Material)

In the configuration (B), the base material may be a porous resin compact. The base material may be composed of a plurality of porous resin compacts, or may be composed of a single porous resin compact.

(Porous Resin Compact)

The porous resin compact to be the base material, for example, may be the one having pores formed inside by sinter-molding synthetic resin powder and the one having foam-molded synthetic resin (in other words, foamed compact). Further, for the reason similar to the case of the porous fiber structure described above, it is preferable that the porous resin compact includes many open pores, and it is preferable that the porosity is greater than or equal to 10% and less than or equal to 80%.

(Synthetic Resin)

As synthetic resin to be raw material of the porous resin compact, resin such as polyester-based synthetic resin, acrylic synthetic resin, polyamide-based synthetic resin, or polyurethane-based synthetic resin can be employed. More specifically, as polyester-based synthetic resin, it is preferable to employ polybutylene terephthalate and polyethylene terephthalate. As acrylic synthetic resin, it is preferable to employ acrylonitrile and Modacryl manufactured by Kaneka Corporation. Further, as polyamide-based synthetic resin, it is preferable to employ nylon 6, nylon 66, and nylon 612. Further, as polyurethane-based synthetic resin, it is preferable to employ "Kikulon (registered trademark)" which is polyurethane manufactured by Kikulon Co., Ltd.

Among those illustrated above, a foamed compact made of polyurethane (in other words, urethane foamed compact) is preferable in view of manufacturing cost and easiness in obtaining desired porosity.

(Conductive Material)

As conductive material in the configuration (B), the one described as conductive material in the configuration (A) can be favorably employed. Similar to applying a conductive process to an aggregate of fibers, dipping the porous resin compact in the process liquid described above can modify not only the outer surface of the porous resin compact but also the surface in the pores.

Here, the modifying amount with the conductive material is preferably greater than or equal to 1 mass % and less than or equal to 30 mass % with respect to the mass of the base material made of the porous resin compact. When the modifying amount falls within the range, the core portion tends to be easy to exhibit the function described above. Here, the preferable range of the modifying amount is greater than or equal to 1 mass % and less than or equal to 15 mass %, and the particularly preferable range is greater than or equal to 2 mass % and less than or equal to 7 mass %.

(Others)

Further, also in the configuration (B), similarly to the case of the configuration (A), the binder such as silane coupling agent may be used to bind the porous resin compact and the conductive material to prevent separation of the conductive material.

<<Brush Tip>>

Brush tip 5 includes conductive material. Here, as brush tip 5, all of the configuration described above as core portion 4 can be employed. In other words, the conductive fiber may be included, and it may also be an aggregate of fibers or a porous resin compact applied with the conductive process. Brush tip 5 and core portion 4 may be of the same material or may be a integrated object. In the case of the integrated object, the number of parts can be reduced, so that simplification of the manufacturing steps can be made, thus it is preferable in view of manufacturing cost.

The base material of brush tip 5 is preferably base material made of synthetic fiber or porous resin compact similar to core portion 4. These base materials have high cushioning characteristics, thus it does not damage the panel. Further, repeated use is possible, and it has superior durability.

Further, as brush tip 5, metal material, synthetic resin, and the one having synthetic fiber kneaded with conductive powder can be used, other than those illustrated as core portion 4. In other words, brush tip 5 may be a metal compact or a resin compact containing conductive powder. Further, the conductive powder is not particularly limited. For example, carbon-based conductive powder, inorganic conductive powder, organic conductive powder, metal-based conductive powder, or the like may be employed.

FIGS. 3A-3D represent examples of a shape of brush tip 5. These are mere examples, and the shape of brush tip 5 is not limited to these. The shape of brush tip 5 may be changed as needed taking in consideration the operability and designability.

Figure 3A:
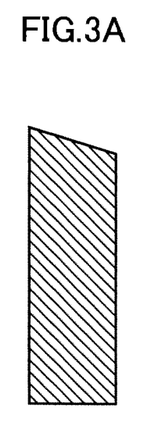
FIG. 3A schematically represents an example of a brush tip constituting a writing instrument for an electrostatic capacitance type touch panel according to the embodiment of the present invention.
Figure 3B:
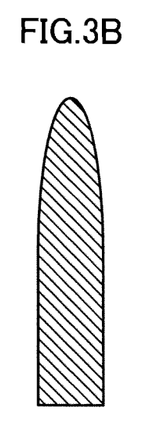
FIG. 3B schematically represents an example of a brush tip constituting a writing instrument for an electrostatic capacitance type touch panel according to the embodiment of the present invention.
Figure 3C:
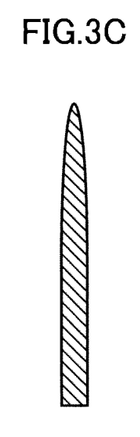
FIG. 3C schematically represents an example of a brush tip constituting a writing instrument for an electrostatic capacitance type touch panel according to the embodiment of the present invention.
Figure 3D:
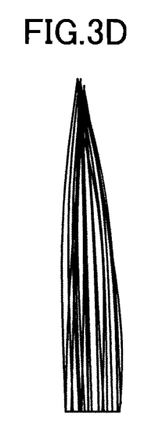
FIG. 3D schematically represents an example of a brush tip constituting a writing instrument for an electrostatic capacitance type touch panel according to the embodiment of the present invention.

FIG. 3D represents brush tip 5 which is a fiber bundle. This fiber bundle is formed by orienting a plurality of fibers in one direction and bundling the same, and thereafter binding and bundling by glue and/or heat on one end. Here, depending on the purpose of use, a whole outer contour of the fiber bundle can be bonded to have a sharp tip.

As described above, when the brush tip is a fiber bundle, the fiber bundle preferably includes a conductive fiber having base material made of synthetic fiber and covered with conductive material, and the conductive fiber preferably has a tapered shape at an end on the side in contact with the panel.

As a method for obtaining such a conductive fiber, one end of the base material made of synthetic fiber may be dipped in alkaline aqueous solution such as sodium hydroxide aqueous solution so as to be partially dissolved to form a tapered shape at the end, and conductive processing may be applied.

By providing a tapered shape at an end on the side in contact with the panel, self-discharging characteristics of the conductive fiber is improved, so that response sensitivity of the touch panel can be improved.

Further, polybutylene terephthalate is favorable for the synthetic fiber of this case. Polybutylene terephthalate has sufficient hardness and is smooth, so that feeling of use like a writing brush or a paintbrush can be achieved.

The brush tip made of fiber bundle as described above enables multi-touch exhibiting feeling like a writing brush or a paint brush. Therefore, it has high usability in the field of art.

Second Embodiment

Writing Instrument

Figure 2:
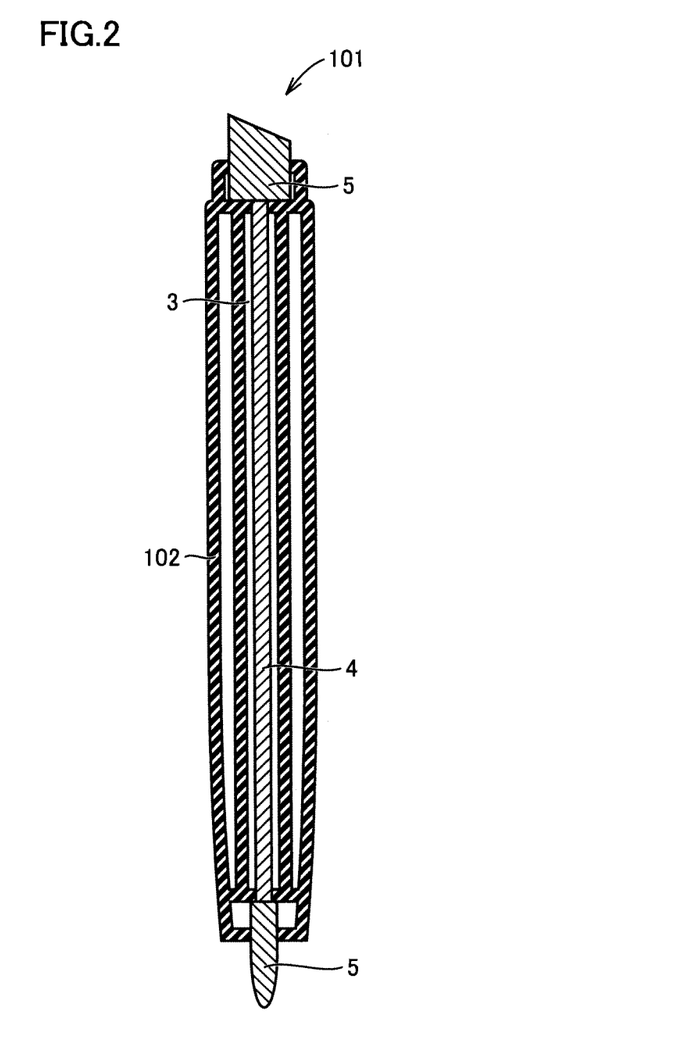
FIG. 2 is a cross-sectional view schematically representing another one example of a writing instrument for an electrostatic capacitance type touch panel according to an embodiment of the present invention.

FIG. 2 is a cross-sectional view schematically representing a writing instrument for an electrostatic capacitance type touch panel as another example of the embodiments of the present invention. A writing instrument 101 shown in FIG. 2 has brush tips 5 on opposite ends of a main body shaft 102, and the shape and size of the brush tips 5 at respective ends are different. Other features are similar to writing instrument 1, thus writing instrument 101 includes hollow portion 3 and core portion 4.

Writing instrument 101 having the configuration described above, similarly to writing instrument 1, has a superior effect that it is gripped at a non-conductive main body shaft 102 and comes into contact with a panel surface at brush tip 5 so that operation of the electrostatic capacitance type touch panel can be achieved. Then, according to the purpose of use, brush tip 5 can be properly used, so that versatility and convenience are high.

EXAMPLES

Hereinafter, the present invention will be described more in detail with reference to examples but is not limited to the examples.

As will be described hereinafter, writing instruments for an electrostatic capacitance type touch panel according to one embodiment of the present invention are produced, and operation test for the touch panel is conducted with use of a commercially available smart phone. In the following description, a surface electric resistance value is a value measured with use of a resistance measuring instrument (name of the product: SANWA SD-420C, manufactured by Sanwa Electric Instrument Co., Ltd.).

Examples 1-3

Example 1

First, using polypropylene which is non-conductive material as raw material, a main body shaft (outer diameter: 10 mm, inner diameter: 8 mm, length: 100 mm) having a hollow portion was produced by injection molding.

Next, "Thunderlon (registered trademark)" (material: short fiber, type: 1T×38 mm, density: 1.15 g/cm$^3$) manufactured and sold by Nihon Sanmo Dyeing Co., Ltd., which is a conductive fiber having base material made of acrylic synthetic fiber and covered with copper sulfide which is conductive material, was prepared. The surface electric resistance value of this Thunderlon was 100 Ωcm.

Next, a tube made of polyethylene (outer diameter: 6.44 mm, inner diameter: 5.48 mm, length: 76 mm) was prepared, and the tube was filled with 0.1 g of Thunderlon to produce the core portion. At this time, the porosity of the core portion was 95%.

Here, the porosity of the core portion was calculated as follows. First, an internal volume of the tube was calculated, assuming that a cross section perpendicular to the longitudinal direction of the tube is a true circle. Next, the mass of Thunderlon filled in the tube was divided by the internal volume of the tube to obtain the density of the core portion. Then, the porosity was calculated with the following formula.

Porosity(%)={1−(Density of Core Portion/Density of Thunderlon)}×100    Formula:

Next, a felt made of Thunderlon manufactured and sold by Nihon Sanmo Dyeing Col., Ltd. (hereinafter, also referred to as a Thunderlon felt) was prepared, and it was cut into columns each having an outer diameter of 4 mm and a length of 20 mm to produce a brush tip. The surface electric resistance value of the Thunderlon felt was 100 Ωcm, and the porosity was 60%.

Next, the portion of 5 mm from the brush tip in the longitudinal direction was inserted into one opening of the core portion (in other words, one opening of the tube), to join the brush tip and the core portion together. Accordingly, a joint body composed of the brush tip and the core portion was obtained. At this time, in the tube, Thunderlon (conductive fiber) and the Thunderlon felt (conductive fiber structure body) were in contact with each other. In other words, the brush tip and the core portion were in contact with each other.

Next, the joint body composed of the brush tip and the core portion was inserted into the main body shaft produced in the manner described above, and fixed to produce the writing instrument according to Example 1.

Example 2

Firstly, a Thunderlon felt (surface electric resistance value: 100 Ωcm, porosity: 60%) similar to the one described above was cut into columns each having an outer diameter of 4 mm and a length of 80 mm. A portion of 65 mm from an end of the processed Thunderlon felt in the longitudinal direction was inserted into the tube made of polyethylene similar to the one described above to produce the brush tip and the core portion constituting an integrated object.

Then, other than using the brush tip and the core portion constituting an integrated object, the configuration was set to be similar to Example 1 to produce the writing instrument according to Example 2.

Example 3

Firstly, a porous fiber structure (shape: columnar, outer diameter: 4 mm, length: 80 mm) formed by pultruding polyester-based synthetic fiber was prepared.

This porous fiber structure was dipped in the process liquid containing copper sulfide and sodium thiosulfate as reducing agent to modify the porous fiber structure with copper sulfide which is conductive material. At this time, the modifying ratio was 6 mass %. Further, the surface electric resistance of the porous fiber structure after being applied with the conductive process (hereinafter, referred to as conductive porous fiber structure) was 500 Ωcm to 700 Ωcm, and the porosity was 70%.

Then, other than using the conductive porous fiber structure as the brush tip and the core portion being a integrated object, the configuration was set to be similar to Example 1 to produce the writing instrument according to Example 3.

Comparative Examples 1-3

Comparative Example 1

In the writing instrument of Example 1, a writing instrument according to Comparative Example 1 was produced similarly to the writing instrument of Example 1, other than the configuration of not using the core portion. In other words, the writing instrument of Comparative Example 1 has a main body shaft, a hollow portion, and a brush tip but does not have a core portion.

Comparative Example 2

Commercially available aluminum foil (thickness: 12 μm) was cut into a certain size and wound to have a columnar wound body having an outer diameter of 4 mm and a length of 70 mm. Then, the writing instrument according to Comparative Example 2 was produced similarly to Example 1, other than the configuration of using the columnar wound body as the core portion.

Comparative Example 3

Commercially available aluminum foil (thickness: 12 μm) was cut into a certain size and wound to have a columnar wound body having an outer diameter of 4 mm and a length of 80 mm. Then, the writing instrument according to Comparative Example 3 was produced similarly to Example 2, other than the configuration of using the columnar wound body as a brush tip and the core portion as an integrated object.

<Evaluation>

<<Touch Panel Operation Test>>

Using the writing instruments of the Examples and Comparative Examples produced in the manner as described above, operation test for the electrostatic capacitance type touch panel was conducted.

Firstly, a touch panel of a commercially available smart phone "GALAXY S (registered trademark)" was touched with the writing instruments to confirm if there is a response. Further, for those exhibited a response, touching is repeated every ten seconds, and this operation was continued for ten minutes to confirm if continuous operation can be performed.

The test result and the configuration of each instrument is shown in Table 1. In Table 1, at the column of "continuous operation," the term "possible" indicates that there was no change in response sensitivity within continuous operation for ten minutes, and the term "not possible" indicates no response or lowered response sensitivity within continuous operation for ten minutes. Here, the lowered response sensitivity indicates that the time taken between touching the panel and receiving a response becomes long.

TABLE 1

| | Configuration of Writing Instrument | | | Touch-panel Operation Test | |
|---|---|---|---|---|---|
| | Material of Main Body Shaft | Core Portion | Brush Tip | Response | Continuous Operation |
| Example 1 | Polypropylene | Fill Thunderlon (short fiber) into tube | Thunderlon felt | Present | Possible |
| Example 2 | Polypropylene | Thunderlon Felt (core portion and blush tip constituting an integrated object) | | Present | Possible |
| Example 3 | Polypropylene | Conductive polyester-based porous fiber structure (core portion and blush tip constituting an integrated object) | | Present | Possible |
| Comparative Example 1 | Polypropylene | No | Thunderlon felt | Present | Not possible |
| Comparative Example 2 | Polypropylene | Aluminum foil | Thunderlon felt | Absent | — |
| Comparative Example 3 | Polypropylene | Aluminum foil (core portion and blush tip constituting an integrated object) | | Absent | — |

As is clear from Table 1, the writing instruments of the Example in which the core portion composed of a member having the base material made of non-conductive material and modified with conductive material is provided and in which the core portion is in contact with the brush tip including conductive material enables stable continuous operation to the touch panel. On the other hand, the writing instruments of the Comparative Examples without this configuration do not exhibit a response of the touch panel, or continuous operation is not possible even when a response is exhibited.

From the above, the writing instrument of the Example for the electrostatic capacitance type touch panel includes a main body shaft having a hollow portion and made of non-conductive material, a core portion composed of a member having base material made of non-conductive material and modified with conductive material, and a brush tip including conductive material, and the core portion is provided in the hollow portion, and the brush tip and the core portion are in contact with each other, so that it could be confirmed that the touch panel operation is possible even in the state where the brush tip and a human body are insulated from each other.

This result indicates that the writing instruments of the Examples for the electrostatic capacitance type touch panel can employ non-conductive material for the main body shaft, and that the stable touch panel operation can be performed.

Although the present invention has been described and illustrated in detail, it is clearly understood that the same is by way of illustration and example only and is not to be taken by way of limitation, the scope of the present invention being interpreted by the terms of the appended claims.

REFERENCE SIGN LIST

1, 101 writing instrument; 2, 102 main body shaft; 3 hollow portion; 4 core portion; 5 brush tip.

What is claimed is:

1. A writing instrument for an electrostatic capacitance type touch panel, comprising:
   a main body shaft having a hollow portion and made of non-conductive material;
   a core portion composed of a member having base material made of non-conductive material and modified with conductive material; and
   a brush tip including conductive material,
   said core portion being provided in said hollow portion, and
   said brush tip and said core portion are in contact with each other, and
   said member being a conductive fiber having base material made of a polyester-based synthetic fiber, an acrylic synthetic fiber, or a polyamide-based synthetic fiber and covered with conductive material, and
   said core portion being formed by filling a cylindrical body filled with said conductive fiber.

2. The writing instrument for an electrostatic capacitance type touch panel according to claim 1, wherein said core portion is a porous body.

3. The writing instrument for an electrostatic capacitance type touch panel according to claim 1, wherein said base material made of a synthetic fiber has a fiber diameter of greater than or equal to 5 μm and less than or equal to 200 μm, and
   said conductive fiber has a surface electric resistance value of greater than or equal to $10^{-1}$ Ωcm and less than or equal to $10^9$ Ωcm.

4. The writing instrument for an electrostatic capacitance type touch panel according to claim 1, wherein said conductive material is sulfide made of at least one kind of metal selected from a group consisting of Cu, Ag, Pd, and Co, or plated metal made of at least one kind of metal selected from a group consisting of Cu, Ag, and Ni.

5. The writing instrument for an electrostatic capacitance type touch panel according to claim 1, wherein said core portion and said brush tip constitute an integrated object.

6. The writing instrument for an electrostatic capacitance type touch panel according to claim 1, wherein a porosity of said core portion is greater than or equal to 10% and less than or equal to 95%.

* * * * *